(12) United States Patent
Reynolds et al.

(10) Patent No.: US 10,400,838 B2
(45) Date of Patent: Sep. 3, 2019

(54) CALIPER HARDWARE PROVIDING SEPARATION BETWEEN PAD AND ROTOR

(71) Applicants: Tom Reynolds, Shelton, CT (US); Gus Loschiavo, Shelton, CT (US); Zack Lindsly, Shelton, CT (US)

(72) Inventors: Tom Reynolds, Shelton, CT (US); Gus Loschiavo, Shelton, CT (US); Zack Lindsly, Shelton, CT (US)

(73) Assignee: Preferred Tool & Die, Inc., Shelton, CT (US)

( * ) Notice: Subject to any disclaimer, the term of this patent is extended or adjusted under 35 U.S.C. 154(b) by 0 days.

(21) Appl. No.: 15/656,686

(22) Filed: Jul. 21, 2017

(65) Prior Publication Data
US 2018/0023645 A1    Jan. 25, 2018

Related U.S. Application Data

(60) Provisional application No. 62/365,000, filed on Jul. 21, 2016.

(51) Int. Cl.
| | | |
|---|---|---|
| F16D 65/097 | (2006.01) | |
| F16D 55/22 | (2006.01) | |
| F16D 55/226 | (2006.01) | |
| F16D 55/00 | (2006.01) | |

(52) U.S. Cl.
CPC ......... *F16D 65/0977* (2013.01); *F16D 55/22* (2013.01); *F16D 55/226* (2013.01); *F16D 65/0972* (2013.01); *F16D 65/0979* (2013.01); *F16D 2055/0008* (2013.01); *F16D 2055/0029* (2013.01)

(58) Field of Classification Search
CPC ............. F16D 65/0977; F16D 65/0975; F16D 65/0979; F16D 2055/0029; F16D 55/22; F16D 55/226
USPC ............................................... 188/72.3, 73.38
See application file for complete search history.

(56) References Cited

U.S. PATENT DOCUMENTS

| | | | |
|---|---|---|---|
| 3,460,651 A | 8/1969 | Burnett | |
| 4,408,681 A * | 10/1983 | Oshima | F16D 65/0977 188/73.38 |
| 5,511,638 A | 4/1996 | Tsuruta | |
| 6,179,095 B1 | 1/2001 | Weiler et al. | |
| D483,709 S * | 12/2003 | Byrd | D12/180 |
| D489,655 S * | 5/2004 | Byrd | D12/180 |
| 7,467,693 B2 | 12/2008 | Barbosa et al. | |

(Continued)

FOREIGN PATENT DOCUMENTS

| | | |
|---|---|---|
| CN | 202381608 U | 8/2012 |
| GB | 2258701 A | 2/1993 |

*Primary Examiner* — Thomas J Williams
(74) *Attorney, Agent, or Firm* — St. Onge Steward Johnston & Reens, LLC

(57) ABSTRACT

A caliper hardware clip including a frame having a top edge, a bottom edge, and a front surface, a first recess formed in the front surface to receive an end of a first brake pad, a second recess formed in the front surface to receive an end of a second brake pad, a separator integrally formed with the frame, the separator including a bridge portion extending forward from a central portion of the top edge of the frame, a first spring arm extending down and left from a left side of the bridge portion along the front surface of the frame, and a second spring arm extending down and right from a right side of the bridge portion along the front surface of the frame.

19 Claims, 10 Drawing Sheets

(56) References Cited

U.S. PATENT DOCUMENTS

| | | | |
|---|---|---|---|
| 8,397,880 B2 | 3/2013 | Chelaidite | |
| 8,869,950 B2 * | 10/2014 | Maehara | F16D 55/227 |
| | | | 188/73.38 |
| 9,422,992 B2 | 8/2016 | Bach et al. | |
| 10,066,688 B2 * | 9/2018 | Kim | F16D 55/2265 |
| 2004/0256183 A1 | 12/2004 | Barbosa et al. | |
| 2007/0251772 A1 | 11/2007 | Tsurumi | |
| 2010/0051393 A1 | 3/2010 | Arioka | |
| 2011/0168503 A1 | 7/2011 | Chelaidite | |
| 2012/0205205 A1 | 8/2012 | Lethorn | |
| 2016/0076611 A1 | 3/2016 | Boyle | |
| 2016/0195148 A1 | 7/2016 | Shin et al. | |

\* cited by examiner

CALIPER HARDWARE PROVIDING SEPARATION BETWEEN PAD AND ROTOR

FIELD OF THE INVENTION

The invention relates to disc brakes, and more specifically to caliper hardware for disc brakes which provides separation between the pads and rotor.

BACKGROUND OF THE INVENTION

Disc brakes have been commonplace in automobiles for decades. Most modern cars have disc brakes on the front wheels, and often on all four wheels. Disc brakes generally include a rotor or disc connected to the wheel and/or axle, and a pair of brake pads on either side of the rotor that are squeezed inwardly against the rotor by means of a caliper. The caliper may be actuated, for example, hydraulically or pneumatically.

Brake pads generally consist of a metal backing plate with friction material on one side to contact the rotor. The brake pads move inward in relation to the rotor when the brakes are actuated and return in an outward direction thereafter. The caliper typically includes hardware or clips that are mounted in the caliper at the ends of the brake pads to position the brake pads in the caliper. While the hardware generally retains the position of the brake pads in some respects, it often does not ensure the brake pads return to and remain in their outward position after brake actuation.

It is common in disc brakes to have a return spring mounted between the two brake pads to assist with returning the brake pads to a rest position after braking. Typically, a single spring is mounted in the middle of the two brake pads and engages the upper parts of the backing plates. See, for example, U.S. Pat. No. 7,467,693 to Barbosa et al. The return spring helps to prevent the pads from dragging on the rotors when braking is not desired. However, such a spring may provide an uneven return and retention force on the brake pads. Thus, in some instances, the brake pads may become misaligned with respect to rotor and portions of the brake pads could drag on the rotor despite the presence of the spring. Further, the spring generally requires that holes in each of the backing plates to receive the spring. Drilling of these holes adds cost and delay to manufacturing.

Some attempts have been made to position return mechanisms at the axial ends of brake pads. U.S. Pat. No. 8,869,950 to Maehara et al. describes a disc brake with pad clips and return springs. Maehara uses a return spring which is attached to a pad clip. This design requires a series of constraining sections and protruding pieces on the pad clip to retain the spring. It also requires two separate pieces which complicates manufacturing and reduces reliability in that the parts can separate.

U.S. Pat. No. 8,397,880 to Chelaidite discloses a pad retraction device. As shown in FIG. 6, some embodiments employ a separate spring as in Maehara. As recognized in Chelaidite, adding a spring can adversely affect the vibration and/or noise performance of the braking system. The remaining embodiments use arms with an overlapping portion or lip on the end of the arm to pull the brake pads outward. This design is complex to manufacture requiring several bends and may lack rigidity due to the overlapping portion and may wear over time. A similar design is disclosed in U.S. Patent Application Publication No. 2010/0051393 to Arioka.

Such attempts at providing return mechanisms do not provide a viable solution to overcome the drawbacks of the customary central return spring.

SUMMARY OF THE INVENTION

Accordingly, it is an object of the present invention to provide an improved means to ensure alignment of brake pads in disc brake systems and prevent brake pad drag. It is a further object to provide caliper hardware for with a separator element that acts between the brake pads, and in a pushing manner rather than pulling. It is a further object to provide such caliper hardware that is adapted to replace original equipment parts that may not have such a feature for preventing pad drag.

These and other objectives are achieved by providing a caliper hardware clip having a frame, a first recess or gap for receiving an end of a first brake pad, a second recess or gap for receiving an end of a second brake pad, a first spring element extending from the frame towards the first brake pad and a second spring element extending from the frame towards the second brake pad. In some embodiments, a distal end of the first spring element is positioned in the first recess or gap and a distal end of the second spring element is positioned in the second recess or gap.

Each of the first and second spring elements extend outward from a central portion of the frame. In some embodiments, the frame includes a central separator portion and each of the first and second spring elements are mounted to or formed integrally with the central separator portion.

Further provided is a caliper hardware clip including a frame having a top edge, a bottom edge, and a front surface, a first recess formed in the front surface to receive an end of a first brake pad, a second recess formed in the front surface to receive an end of a second brake pad, a separator integrally formed with the frame, the separator including a bridge portion extending forward from a central portion of the top edge of the frame, a first spring arm extending down and left from a left side of the bridge portion along the front surface of the frame, and a second spring arm extending down and right from a right side of the bridge portion along the front surface of the frame.

Further provided is a disc brake with a rotor, a caliper, two brake pads positioned on opposite sides of the rotor, each brake pad having a proximal end and a distal end, a first caliper hardware clip receiving the proximal ends of the two brake pads, and a second caliper hardware clip receiving the distal ends of the two brake pads. Each of the caliper hardware clips includes a first spring element extending outward towards a first one of the brake pads and a second spring element extending outward towards a second one of the brake pads.

In some embodiments, each of the caliper hardware clips has a first recess for receiving one of the ends of each of the two brake pads and a second recess for receiving an opposite one of the ends of the two brake pads. A distal end of the first spring element is positioned in the first recess and a distal end of the second spring element is positioned in the second recess.

Other objects of the invention and its particular features and advantages will become more apparent from consideration of the following drawings and accompanying detailed description.

DETAILED DESCRIPTION OF THE INVENTION

Figure 1:
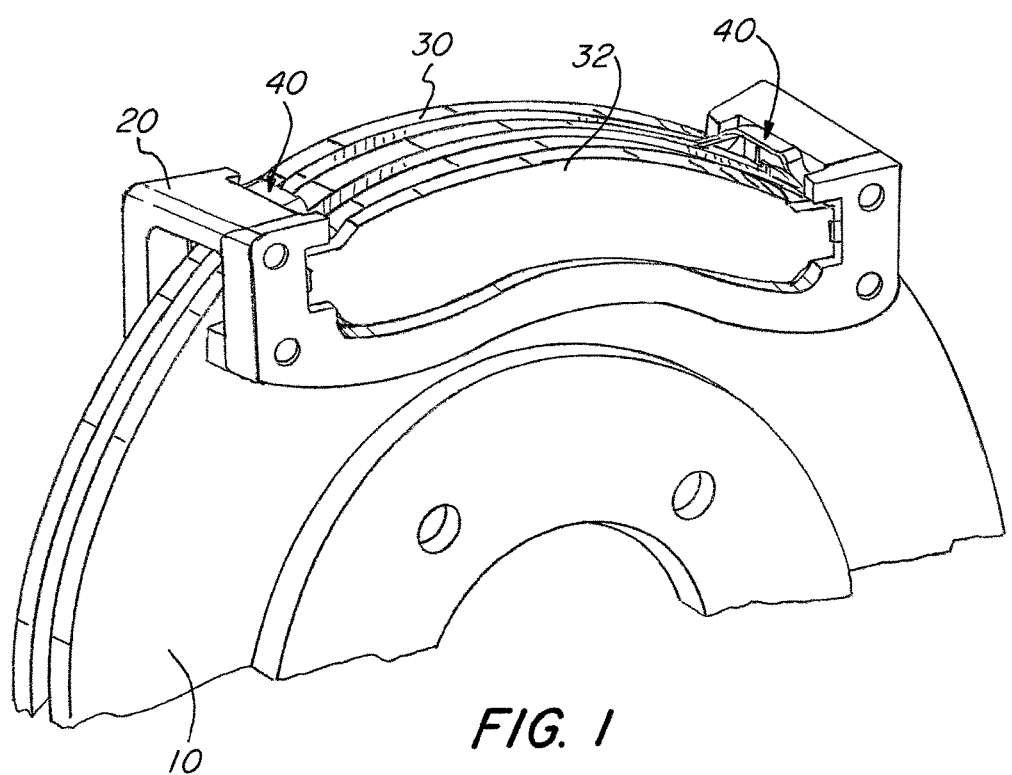
FIG. 1 illustrates a disc brake according to an exemplary embodiment of the present invention.
Figure 7:
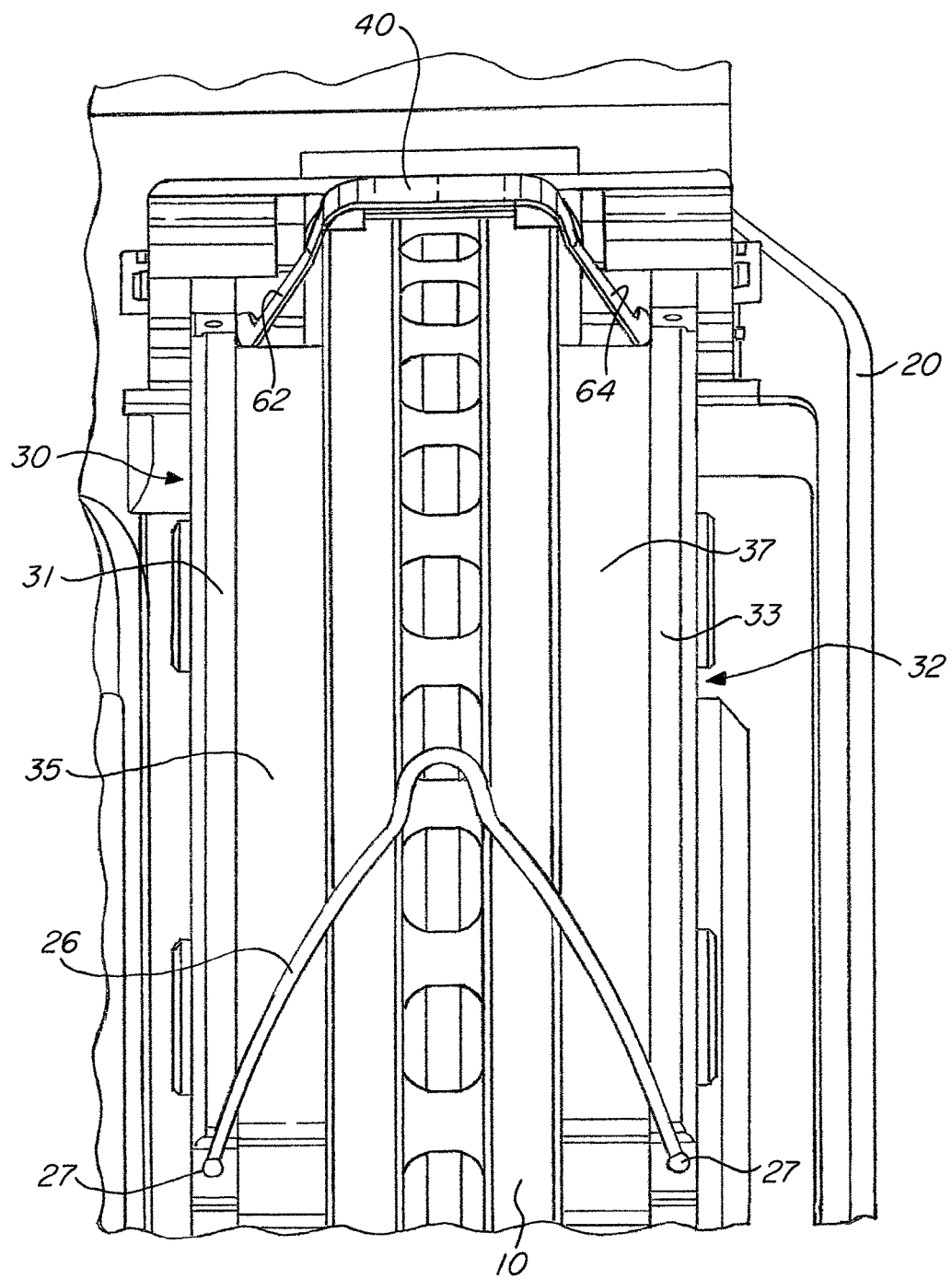
FIG. 7 is a top partial view of the disc brake in a braking position.
Figure 8:
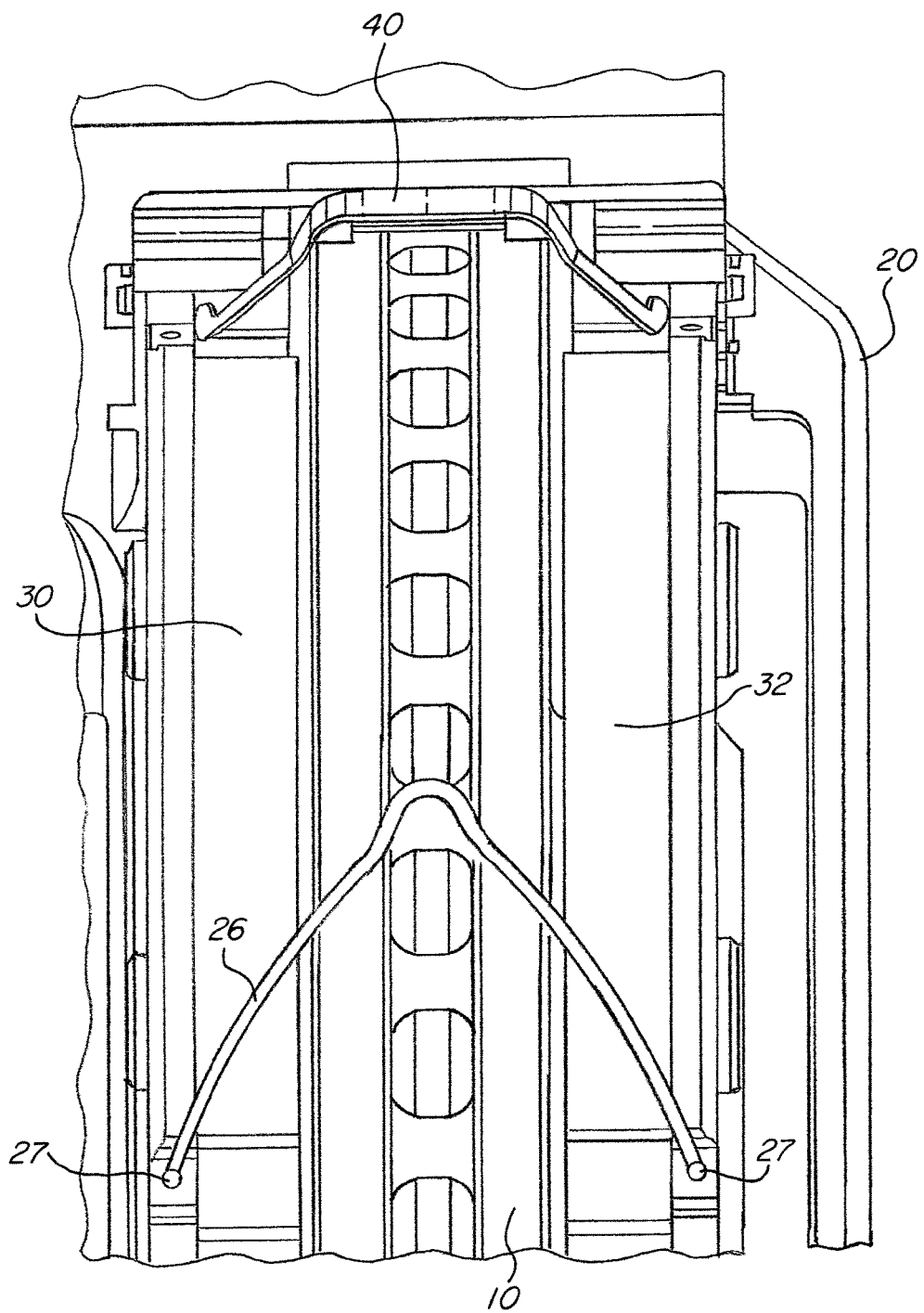
FIG. 8 is a top partial view of the disc brake in a non-braking position.

FIG. 1 shows a disc brake according to an exemplary embodiment of the present invention. The disc brake includes a rotor 10 and a caliper 20. Within the caliper 20, there are two brake pads 30, 32 disposed on opposite sides of the rotor 10. Each of the brake pads 30, 32 includes a backing plate on the outboard side and friction material on the inboard side adjacent to the rotor 10 (as shown in FIGS. 7-8).

The disc brake includes two caliper hardware elements or clips 40 disposed at opposite ends of the brake pads 30, 32 and within the caliper 20. As discussed below, the caliper hardware 40 advantageously includes a separator element that pushes the brake pads 30, 32 apart. The inventors have found that the separator of the present design that pushes the brake pads 30, 32 outward, rather than pulling outward as in some prior art designs, provides an even and repeatable force with minimal deformation and/or reduction in force over time. The caliper hardware 40 of the present invention is also easier to manufacture and requires less material than prior art designs. Further, the design advantageously leaves the central opening of the caliper hardware 40 clear of any obstructions that could interfere with braking or complicate installation. The caliper hardware 40 can be used on original equipment manufacturer ("OEM") brakes, but is particularly useful in the aftermarket for replacing OEM caliper hardware that does not have such a feature for preventing pad drag.

FIGS. 2-6 show views of one embodiment of the caliper hardware 40 or caliper hardware clip. The caliper hardware 40 is preferably stamped or formed from a single piece of material, thus avoiding the necessity to manufacture and join separate parts. The caliper hardware 40 has a frame 42 defining two cavities or recesses 44, 46 to receive proximal or distal portions of the brake pads 30, 32. The frame 40 is shaped to conform to and/or interlock with the caliper 20. The frame 40 may also include a retaining element extending rearward with tabs to interlock or connect with caliper 40 (see FIG. 5).

As depicted in FIG. 1, typically two caliper hardware pieces are used, one on each end of the caliper 20. Thus, recess 44 receives a distal portion of a first brake pad 30 (or backing plate thereof) and recess 46 receives a distal portion of a second brake pad 32 (or backing plate thereof). Proximal portions of each of the first and second brake pads 30, 32 (or backing plates thereof) are received in respective recesses of the second caliper hardware piece positioned at the opposite end of the caliper 20.

Figure 5:
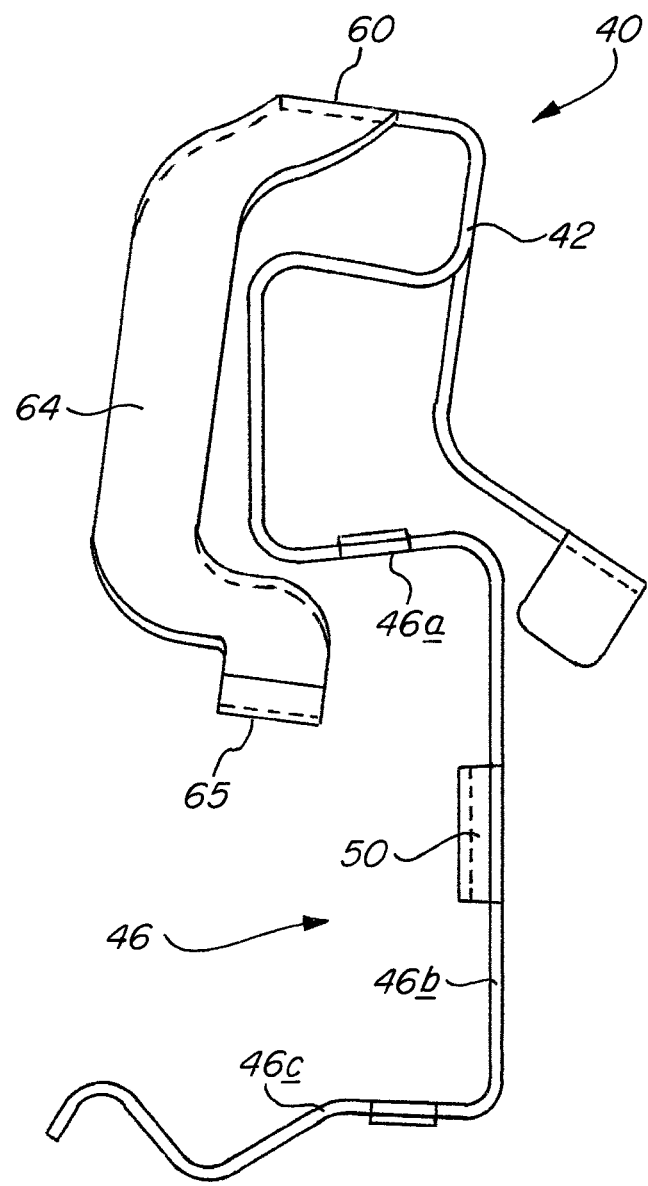
FIG. 5 is a side view of the caliper hardware of the disc brake shown in FIG. 1.
Figure 6:
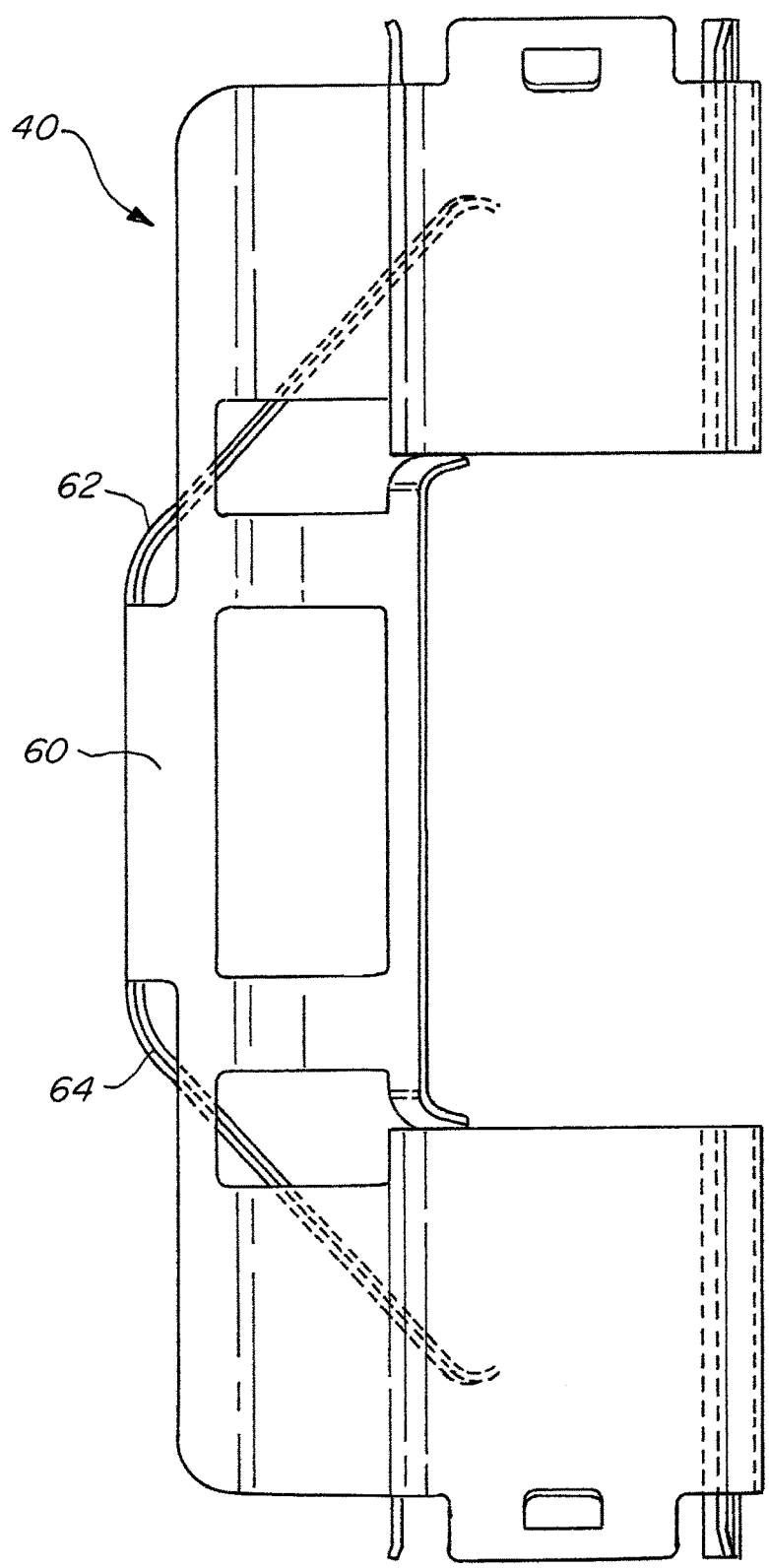
FIG. 6 is a rear view of the caliper hardware of the disc brake shown in FIG. 1.

Each of the cavities are defined by a top wall, a back wall, and a bottom wall. For example, FIG. 5 shows a top wall 46a, a back wall 46b, and a bottom wall or shelf 46c. Within each of the cavities 44, 46, there is a tab 48, 50 that abuts or is adjacent to a rear surface of the backing plates of the brake pads 30, 32 when the brake pads 30, 32 are in non-braking positions.

Figure 2:
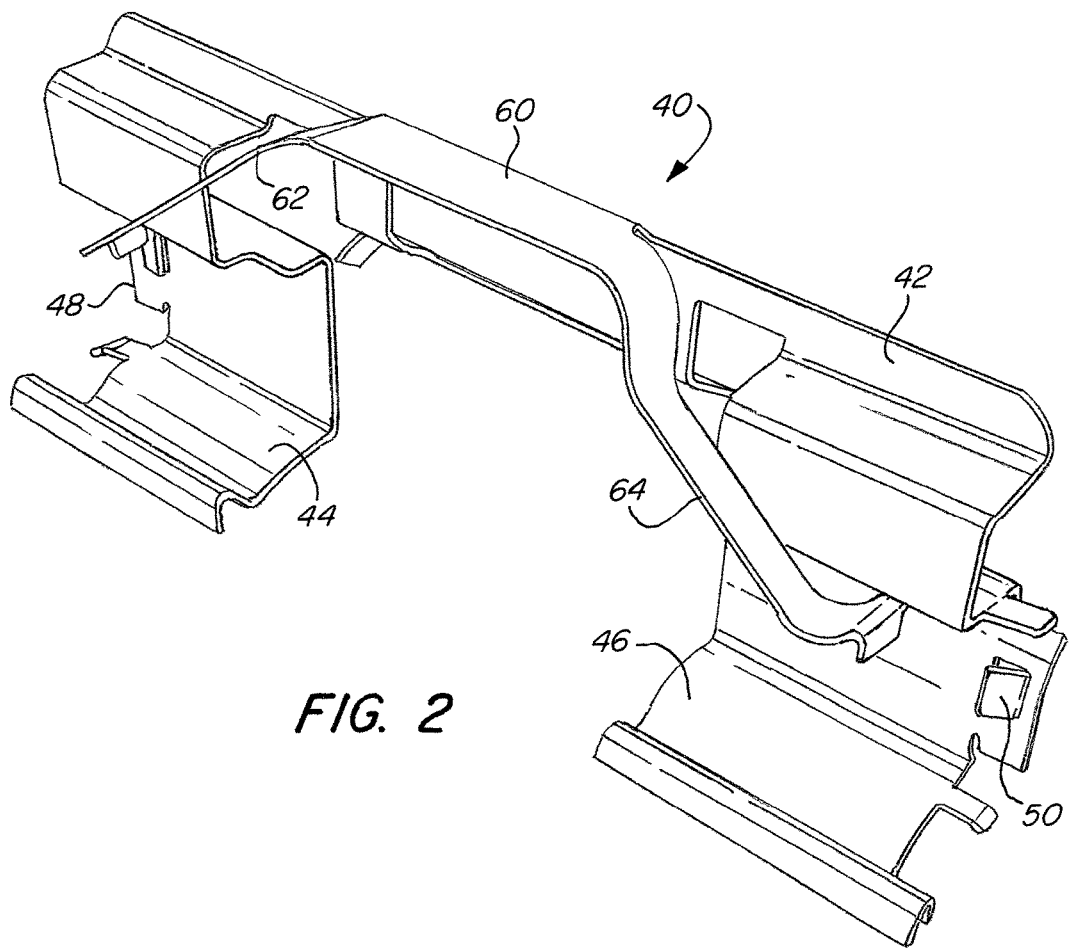
FIG. 2 is a perspective view of the caliper hardware of the disc brake shown in FIG. 1.
Figure 3:
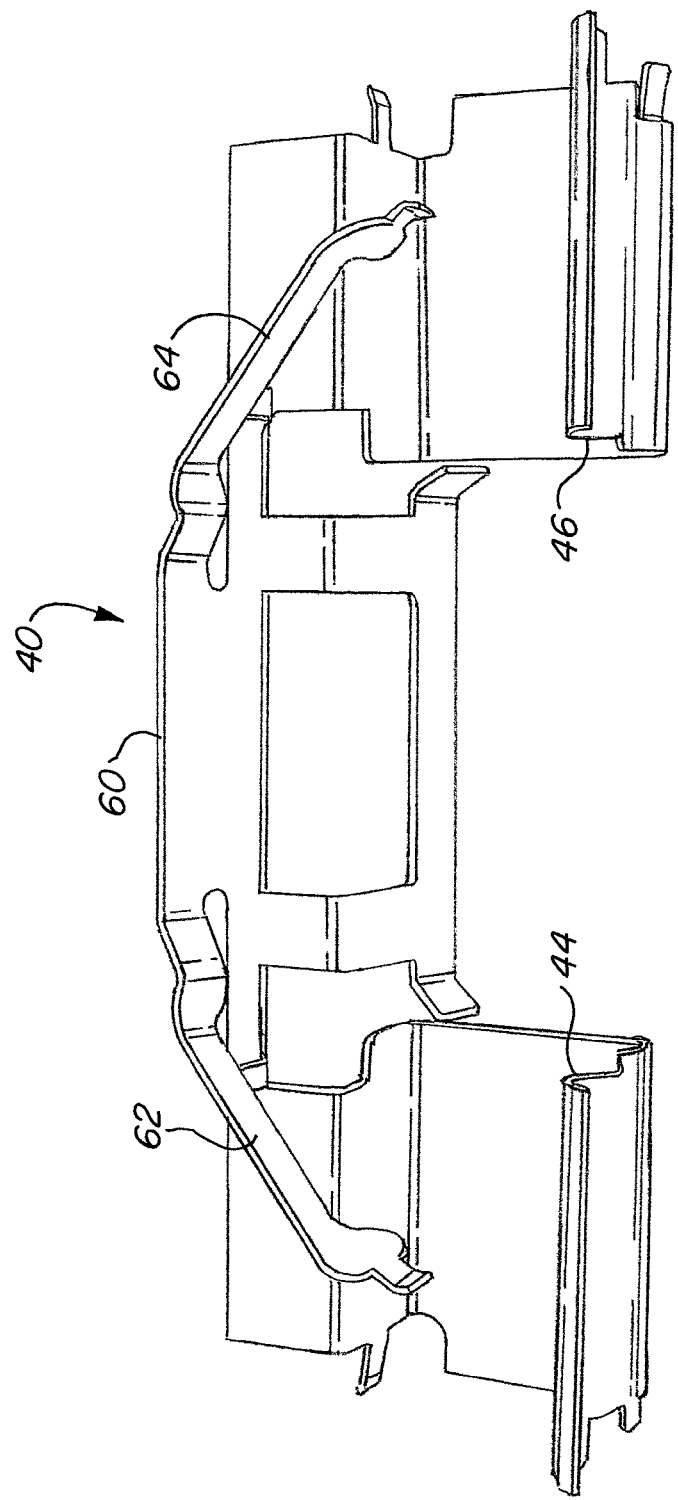
FIG. 3 is a front view of the caliper hardware of the disc brake shown in FIG. 1.
Figure 4:
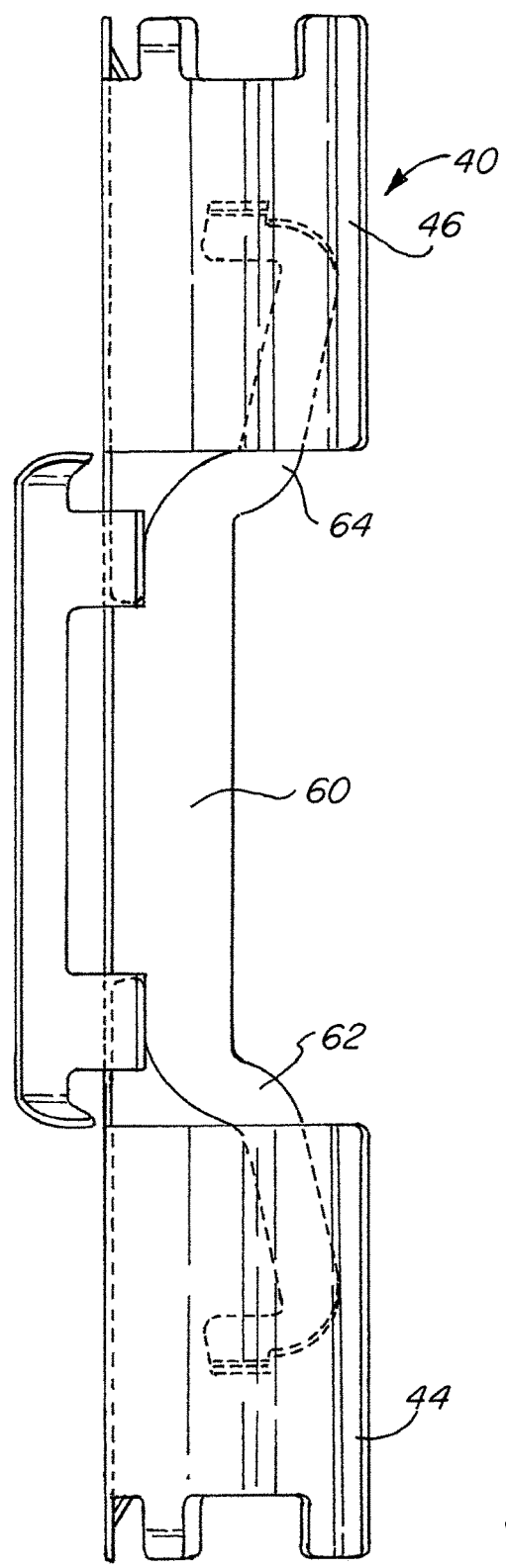
FIG. 4 is a top view of the caliper hardware of the disc brake shown in FIG. 1.

In the exemplary embodiment, the caliper hardware 40 has a separator 60 which, when in use, is located between the distal or proximal ends or two brake pads, 30, 32. The separator 60 includes a central bridge portion and two spring elements 62, 64. As shown in FIG. 2, the bridge portion extends forward from the frame 42 in a direction towards the center of brake pads 30, 32. The spring elements 62, 64 extend on an angle both outward (towards respective brake pads 30, 32) from opposite ends of the bridge portion of the separator 60 and downward towards the bottom walls (e.g., 46a). In one embodiment, the spring elements 62, 64 extend downward at an angle of at least thirty degrees or approximately forty-five degrees.

In the exemplary embodiment, the caliper hardware 40 is made a single piece of material, such as sheet metal, with a uniform thickness. The spring elements 62, 64 have a thickness substantially equal to a thickness of the rest of the caliper hardware 40 (e.g., the frame) and a width of at least three times, such as five times or ten times, that of the thickness.

As shown in FIG. 5, in the exemplary embodiment, the spring elements 62, 64 have a shape that curves forward towards the center of the brake pads, extends along a straight portion, and curves backwards and away from the center at a distal end 65. In the exemplary embodiment, the distal end 65 of each of the spring elements 62, 64 is at least partially positioned within one of the cavities 44, 46 and below and/or adjacent to the top wall (e.g., 46a) thereof. This design keeps the spring elements 62, 64 away from the friction material 35, 37 and minimizes or avoids any intrusion of spring elements 62, 64 into the area where the brake pads 30, 32 contact the rotor 10. The distal end 65 may also extend downward in the cavities 44, 46 to provide increased surface area to contact the brake pads 30, 32. In the exemplary embodiment, the distal ends 65 of the spring elements 62, 64 are spaced apart from one another by approximately 2.5 inches.

FIGS. 7-8 illustrate the use of the caliper hardware 40 on a disc brake. In FIG. 7, the disc brake is actuated and the brake pads 30, 32 are against the rotor 10. The spring elements 62, 64 are at compressed inward by the brake pads 30, 32. In FIG. 8, the disc brake is released and the brake pads 30, 32 are returned to their rest positions. In the rest position, the spring elements 62, 64 are extended and providing a minimal retaining force to keep the brake pads 30, 32 away from the rotor 10. By having a caliper hardware piece or clip 40 at each end of each brake pad 30, 32, the pads are retained evenly away from the rotor to avoid any pad drag on either end.

As shown in FIGS. 7-8, each brake pad includes a backing plate 31, 33 and friction material 35, 37. The friction material 35, 37 covers at least a portion of the interior surface of the backing plate 31, 33. However, there is generally a portion of the interior surface of the backing plate 31, 33 that remains free of friction material 35, 37 such as at the distal and proximal ends of the backing plate 31, 33 and/or around the entire perimeter of the backing plate 31, 33.

The distal ends of the spring elements 62, 64 contact and apply an outward force against the inside of each of the brake pads 30, 32, and particularly on an exposed portion of the interior surface of the backing plates 31, 33 at the distal ends and proximal ends of the backing plates 31, 33 in the cavities 44, 46. After the brakes have been actuated and released, the brake pads 30, 32 return to their rest position as shown in FIG. 8.

The spring elements 62, 64 provide outwardly directed forces against the brake pads 30, 32, to ensure that both the proximal and distal ends of each of the brake pads 30, 32 return to and stay in the rest position and are sufficiently spaced away from the rotor 10. In particular, when the brakes are not applied, the spring elements 62, 64 (being at both ends of the brake pads 30, 32) retain the pads 30, 32 in an even position spaced away from the rotor 10. Applying an outward pushing force, rather than a pulling force, provides for an even and repeatable force.

As shown, some embodiments of the disc brake could also include a spring 26 mounted between the backing plates of each of the brake pads 30, 32. The spring 26 attaches to each of the backing plates via holes 27 in the backing plates. While the spring 26 assists in returning the brake pads 30, 32 to their rest positions after the brakes are actuated, acting alone it may provide an uneven return force on the brake pads 30, 32 and/or still allow some drag during rest given that no force is being applied at the proximal and distal ends of the pads 30, 32. Thus, the caliper hardware 40 of the present invention provides additional spring force on each end of the brake pads 30, 32 ensure even and complete spacing between the brake pads 30, 32 and the rotor 10. In preferred embodiments, particularly when the caliper hardware is used in OEM applications, no such spring 26 is used. This avoids having to drill holes 27 in the backing plates 31, 33 saving time and cost.

Figure 9:
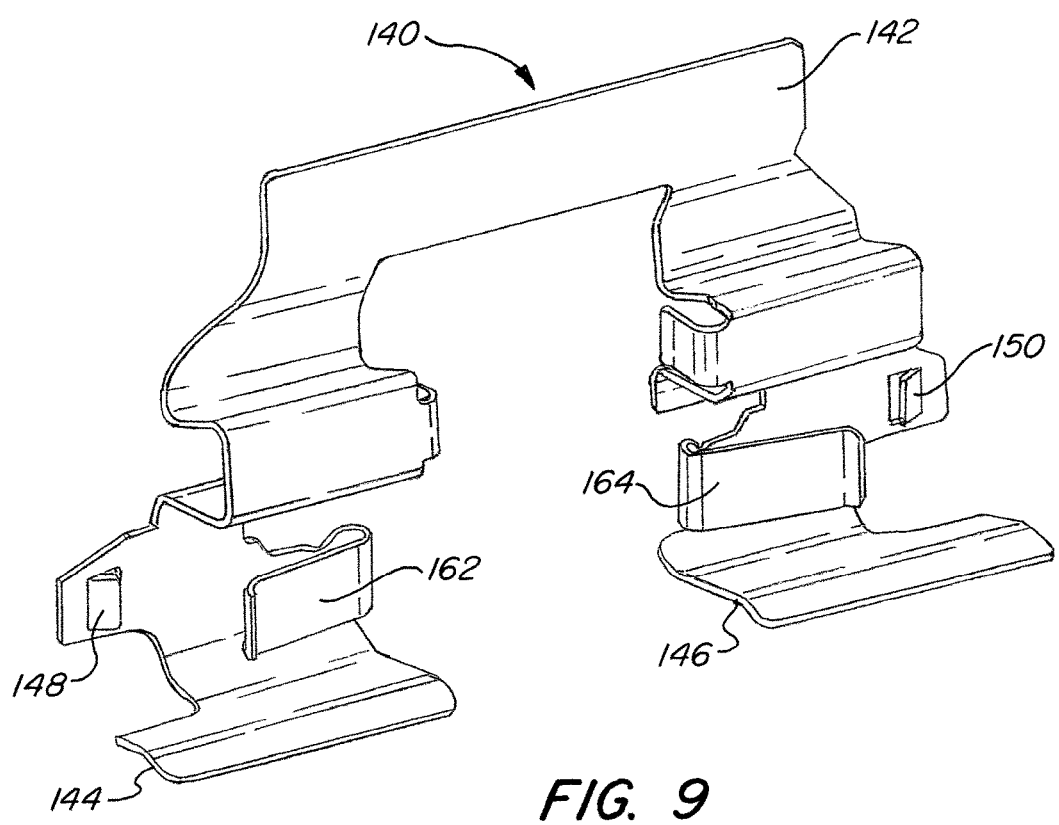
FIG. 9 is a perspective view of another embodiment of the caliper hardware of the disc brake shown in FIG. 1.

The caliper hardware of the present may take different shapes and forms to accommodate different brake applications, sizes, and shapes. FIG. 9 illustrates another embodiment of the caliper hardware 140 for use on the brake shown in FIG. 1. The caliper hardware 140 is preferably stamped or formed from a single piece of material. The caliper hardware 140 has a frame 142 defining two recesses 144, 146 to receive proximal or distal portions of the brake pads 30, 32. The recesses 144, 146 have a top wall, a back wall, and a bottom wall. Within each of the recesses 144, 146, there is a tab 148, 150 that is positioned against and retains a rear surface of the backing plates of the brake pads 30, 32.

The caliper hardware 140 has spring elements 162, 164 that extend outward from an inside edge of the back wall of the recesses and towards the backing plates and/or the tabs 148, 150. Distal ends of each of the spring elements 162, 164 are positioned within one of the recesses 144, 146. The backing plates are retained between the tabs 148, 150 and the distal ends of the spring elements 162, 164. As with the previous embodiment, the hardware 140 provides an even outwardly directed force against the brake pads 30, 32.

Figure 10:
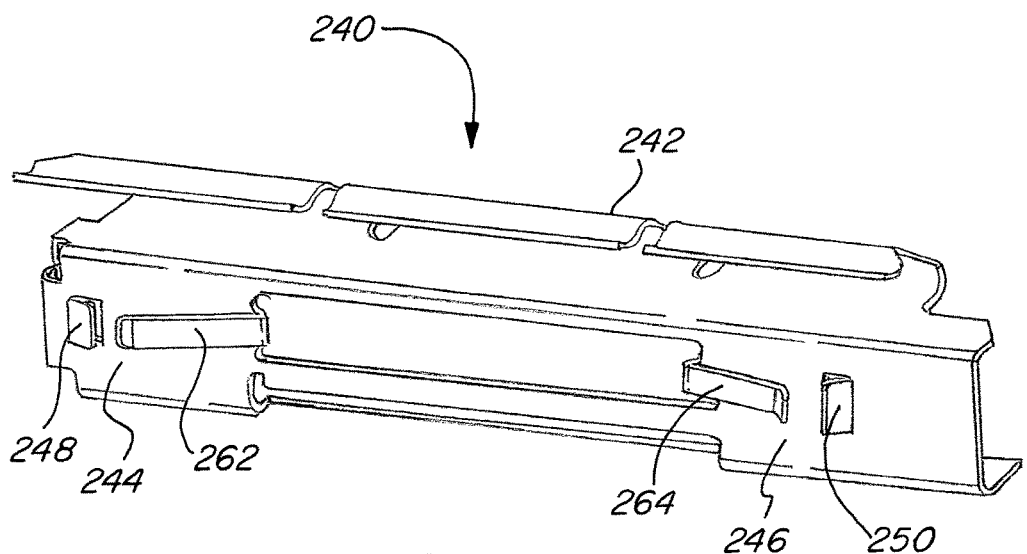
FIG. 10 is a perspective view of another embodiment of the caliper hardware of the disc brake shown in FIG. 1.

FIG. 10 illustrates another embodiment of the caliper hardware 140 for use on the brake shown in FIG. 1. The caliper hardware 240 is preferably stamped or formed from a single piece of material. The caliper hardware 240 has a frame 242 with two gaps 244, 246 to receive proximal or distal portions of the brake pads 30, 32. Within or defining each of the gaps 244, 246, there is a tab 248, 250 that is positioned against and retains a rear surface of the backing plates of the brake pads 30, 32.

The caliper hardware 240 has a central opening with vertical edges from which spring elements 262, 264 extend. The spring elements 262, 264 that extend outward towards the backing plates and/or the tabs 248, 250. The backing plates are retained between the tabs 248, 250 and the distal ends of the spring elements 262, 264. As with the previous embodiments, the hardware 240 provides an even outwardly directed force to the brake pads 30, 32.

Although the invention has been described with reference to a particular arrangement of parts, features and the like, these are not intended to exhaust all possible arrangements or features, and indeed many modifications and variations will be ascertainable to those of skill in the art.

What is claimed is:

1. A caliper hardware clip, comprising:
   a frame having a front surface with a left portion and a right portion, and a top edge extending between the left portion and the right portion;
   a first recess formed in the left portion to receive an end of a first brake pad;
   a second recess formed in the right portion to receive an end of a second brake pad;
   a separator integrally formed with said frame, said separator including a bridge portion extending forward from a central portion of the top edge of said frame, a first spring arm, and a second spring arm, each of the first and second spring arms having a proximal end between the left portion and right portion that is integrally formed with the bridge portion;
   the first spring arm extending directly down and left from its proximal end at a left side of the bridge portion along the left portion of the front surface of said frame, and the second spring arm extending directly down and right from its proximal end at a right side of the bridge portion along the right portion of the front surface of said frame;
   the first spring arm extending essentially entirely along a first plane and the second spring arm extending essentially entirely along a second plane.

2. The caliper hardware clip of claim 1, wherein a distal end of the first spring arm curves at least partially into the first recess in the front surface and a distal end of the second spring arm curves at least partially into the second recess in the front surface.

3. The caliper hardware clip of claim 2, further comprising a first tab formed in the first recess to the left of the distal end of the first spring arm and a second tab formed in the second recess to the right of the distal end of the second spring arm.

4. The caliper hardware clip of claim 3, wherein the end of the first brake pad is positioned between the distal end of the first spring arm and the first tab, wherein the end of the second brake pad is positioned between the distal end of the second spring arm and the second tab.

5. The caliper hardware clip of claim 1, wherein the caliper hardware clip is a single piece of sheet metal.

6. The caliper hardware clip of claim 1, wherein the bridge portion and the front surface of said frame connect perpendicularly.

7. The caliper hardware clip of claim 1, wherein the caliper hardware clip is a single piece of stamped metal.

8. The caliper hardware clip of claim 1, wherein the first spring arm extends down at an angle of at least thirty degrees and the second spring arm extends down at an angle of at least thirty degrees.

9. A disc brake, comprising:
   a caliper having an opening;
   two brake pads within the opening of said caliper positioned on opposite sides of a rotor, each of the two brake pads having a distal end, a proximal end, an inner surface with a friction material adjacent to the rotor, and an outer surface;
a caliper hardware clip according to claim 1 at each of the distal and proximal ends of the two brake pads.

10. A caliper hardware clip, comprising:
a frame having a top edge, a bottom edge, and a front surface;
a first recess formed in the front surface to receive an end of a first brake pad;
a second recess formed in the front surface to receive an end of a second brake pad;
a first spring arm having a proximal end beginning at a central portion of said frame between said first and second recesses and extending directly and to the left from the central portion of the frame into the first recess and terminating at a distal end of the first spring arm outboard of the proximal end, the distal end of the first spring arm terminating within the first recess, and a second spring arm having a proximal end beginning at the central portion of said frame between said first and second recesses and extending directly and to the right from the central portion of the frame into the second recess and terminating at a distal end of the second spring arm outboard of the proximal end, the distal end of the second spring arm terminating within the second recess;
the first spring arm extending essentially entirely along a first plane between its proximal and distal ends and the second spring arm extending essentially entirely along a second plane between its proximal and distal ends.

11. The caliper hardware clip of claim 10, wherein the first spring arm extends down at an angle of at least thirty degrees and the second spring arm extends down at an angle of at least thirty degrees.

12. The caliper hardware clip of claim 10, wherein the first and second spring arms extend horizontally.

13. The caliper hardware clip of claim 10, wherein the caliper hardware clip is a single piece of stamped metal.

14. The caliper hardware clip of claim 10, further comprising a first tab formed in the first recess to the left of a distal end of the first spring arm and a second tab formed in the second recess to the right of a distal end of the second spring arm.

15. A disc brake, comprising:
a rotor;
a caliper;
two brake pads positioned on opposite sides of the rotor, each brake pad having a proximal end and a distal end;
a first caliper hardware clip receiving the proximal ends of the two brake pads;
a second caliper hardware clip receiving the distal ends of the two brake pads;
each of the caliper hardware clips including a central opening fully encircled by a frame, a first spring element, having a proximal end integrally formed with the respective caliper hardware clip at a position adjacent to the central opening, extending directly outward from the central opening towards a first one of the brake pads, and a second spring element, having a proximal end integrally formed with the respective caliper hardware clip at another position adjacent to the central opening, extending directly outward from the central portion towards a second one of the brake pads;
the first spring element extending essentially entirely along a first plane and the second spring element extending essentially entirely along a second plane.

16. The disc brake according to claim 15, wherein each of the caliper hardware clips has a first recess for receiving one of the ends of one of the two brake pads and a second recess for receiving one of the ends of another one of the two brake pads.

17. The disc brake of claim 16, wherein a distal end of the first spring element is positioned in the first recess and a distal end of the second spring element is positioned in the second recess.

18. The disc brake of claim 15, wherein the first spring element extends down from its proximal end at an angle of at least thirty degrees and the second spring element extends down from its proximal end at an angle of at least thirty degrees.

19. A caliper hardware clip, comprising:
a frame having a top edge, a bottom edge, and a front surface;
a first recess formed in the front surface to receive an end of a first brake pad;
a second recess formed in the front surface to receive an end of a second brake pad;
a first spring arm having a proximal end beginning at a central portion of said frame between said first and second recesses and extending left from the central portion of the frame and at least partially within the first recess and terminating at a distal end of the first spring arm outboard of the proximal end, and a second spring arm having a proximal end beginning at the central portion of said frame between said first and second recesses and extending right from the central portion of the frame and at least partially within the second recess and terminating at a distal end of the second spring arm outboard of the proximal end;
wherein the first spring arm extends down at an angle of at least thirty degrees and the second spring arm extends down at an angle of at least thirty degrees.

\* \* \* \* \*